United States Patent [19]

Brauer et al.

[11] Patent Number: 5,036,143
[45] Date of Patent: Jul. 30, 1991

[54] URETHANE ADHESIVE

[75] Inventors: Melvin Brauer, East Brunswick; Clayton C. Crawford, Bayonne, both of N.J.

[73] Assignee: CasChem, Inc., Bayonne, N.J.

[21] Appl. No.: 284,648

[22] Filed: Dec. 15, 1988

Related U.S. Application Data

[62] Division of Ser. No. 38,081, Apr. 14, 1987, Pat. No. 4,889,915.

[51] Int. Cl.$^5$ .......................... C08L 75/14; C08K 5/07
[52] U.S. Cl. ...................................... 524/361; 524/500
[58] Field of Search ................................ 524/361, 500

[56] References Cited

U.S. PATENT DOCUMENTS

| | | | |
|---|---|---|---|
| 3,043,807 | 7/1962 | Snyder | 260/75 |
| 3,926,826 | 12/1975 | Graham et al. | 252/62.54 |
| 4,217,254 | 8/1980 | Legue et al. | 260/3.3 |
| 4,256,615 | 3/1981 | Legue et al. | 260/18 TN |
| 4,340,682 | 7/1982 | Legue et al. | 524/507 |
| 4,446,286 | 5/1984 | Kolycheck et al. | 525/455 |
| 4,569,972 | 2/1986 | Legue et al. | 525/129 |
| 4,585,819 | 4/1986 | Reischle et al. | 524/196 |
| 4,619,955 | 10/1986 | Dreutzler | 524/29 |

Primary Examiner—Ana L. Carrillo
Attorney, Agent, or Firm—Pennie & Edmonds

[57] ABSTRACT

High green strength curable urethane adhesive compositions of a polyol, an organic isocyanate compound, a thermoplastic polyurethane which is soluble in methyl ethyl ketone to at least 1 weight percent for imparting tack and green strength properties to the composition, and, optionally, a solvent for controlling the percent solids and viscosity of the composition.

21 Claims, No Drawings

URETHANE ADHESIVE

This is a division, of application Ser. No. 038,081 filed Apr. 14, 1987, now U.S. Pat. No. 4,889,915.

TECHNICAL FIELD

The invention generally relates to urethane adhesives and, in particular, to those urethane adhesives having a high degree of green strength.

BACKGROUND ART

Polyurethanes which are formed by the reaction of the hydroxyl groups of a polyol with a curing agent, such as an organic isocyanate compound, provide excellent bonding or joining properties when cured, thus forming strong adhesives. By utilizing an isocyanate terminated prepolymer technique, it is possible to obtain moisture curable formulations which provide similar adhesive properties.

These compounds are not useful in certain applications, however, because they exhibit very little green strength, if any, before fully curing. "Green strength" as used herein means the ability of the adhesive to hold two surfaces together when first contacted and before the adhesive develops its ultimate bonding properties when fully cured.

The degree of green strength exhibited by an adhesive is very important in many applications. High green strength adhesives tend to prevent wrinkling and slippage of films during lamination. In panel assembly and packaging, faster handling and wrapping rates can be achieved with such high green strength adhesives. When adhesives are applied to a vertical surface, a sufficiently high green strength allows the adhesive to prevent a mechanically unsupported, bonded member from slipping under the influence of gravity. When employed for flocking, a high green strength adhesive holds the fibers in place while curing. Also, in the laying of carpet or synthetic flooring, adhesives having a high green strength resist curling due to the shape memory of the flooring which is acquired when stored in a roll.

Attempts to increase the green strength of isocyanate terminated prepolymers by adding other high polymers such as polyvinyl acetate, cellulose acetate butyrate, acrylics, polyketones, phenoxy and polyvinylchloride-vinyl acetate copolymers have proven unsuccessful. Other formulations suggest the use of chlorinated rubber or chlorinated polyvinyl chloride in conjunction with ricinoleate urethane polyols or prepolymers. These are described in U.S. Pat. Nos. 4,217,254, 4,256,615, 4,340,682, and 4,569,572. The present invention discloses new and unique compositions which provide an additional solution to this problem.

SUMMARY OF THE INVENTION

The present invention relates to a composition for forming a urethane adhesive having high green strength comprising a polyol, a thermoplastic polyurethane and an organic isocyanate compound. The thermoplastic polyurethane must be soluble in methyl ethyl ketone to at least 1 weight percent and is present in an amount sufficient to impart tack and green strength properties to the adhesive.

Any polyol can be used in this composition, but castor oil, polyhydric alcohols and polyether polyols are preferred. Also, any organic isocyanate compound can be used, with the aromatic, aliphatic or cycloaliphatic polyisocyanates being preferred. The isocyanate compound is added in an amount sufficient to impart curing properties to the composition so as to provide an NCO-/OH ratio of between 0.5/1 and 25/1.

Optionally, a solvent may be used to form a single phase liquid solution, to reduce the viscosity, or to control the percent solids of the composition to a desired range. The most preferred solvent is methyl ethyl ketone.

The invention also relates to curable adhesive compositions made of the reaction product of the polyol, thermoplastic polyurethane and isocyanate compound, as well as to various methods for curing such compositions.

In one embodiment, the curing method includes mixing appropriate amounts of the three components together and allowing them to cure to form the adhesive. Also, a prepolymer of the polyol and isocyanate compound can initially be formed prior to adding the thermoplastic polyurethane thereto. The prepolymer can be isocyanate terminated or hydroxy terminated, depending upon the results desired. The isocyanate terminated prepolymer provides a moisture curable formulation, whereas the hydroxy terminated prepolymer acts as a polyol and can be reacted with further curing agents.

Another aspect of the invention relates to a method for imparting tack and green strength to a urethane adhesive composition of a polyol and an organic isocyanate compound. This method contemplates adding the thermoplastic polyurethane to the composition in an amount sufficient to impart such tack and green strength properties to the adhesive prior to utilizing the adhesive for joining components together. If desired, a solvent can be added for the reasons stated previously.

PREFERRED EMBODIMENT OF THE INVENTION

The aforesaid objects and advantages may be achieved from a mixture of a thermoplastic polyurethane (hereinafter "TPU") with a polyol and isocyanate compound. Hydroxy or isocyanate terminated can also be used. These mixtures may optionally be maintained in a MEK solvent system. The isocyanate groups of the isocyanate terminated prepolymer are free to react with water, polyols, amines, urethanes, ureas and the like to form a cured adhesive. Alternately, an organic isocyanate compound can be added to the TPU/polyol or hydroxy terminated prepolymer mixture to form a two component adhesive composition.

In accordance with the present invention, it has been found that a mixture of polyol, isocyanate and TPU exhibits a unique combination of properties which are not achievable if either product is employed alone or if any of the components are omitted from certain formulations containing the other ingredients. TPUs are known for their fast, tack-free dry and for that reason are often added to formulations to quickly eliminate tack which is the very antithesis of its use in the adhesives claimed in the present invention. The compositions of the invention provide new and unexpected results including converting a polyol/isocyanate product from one having little tack, green strength and cohesiveness to one that is tenacious.

TPU/polyol/isocyanate mixtures in accordance with the present invention are useful in the formulation of pressure sensitive and curable adhesives as well as contact cements. Such mixtures are also useful as tackifying additives, flexibilizing agents, cross-linking agents, adhesion improvers and the like. As used herein, the term "adhesive" is intended to include a joining compound, as well as a coating or other use to which the claimed compositions have utility.

Any polyol can be used in this invention. Polyether polyols derived from propylene oxide or ethylene oxide are particularly suitable due to their low cost and compatibility with a wide range of solvents. Castor oil and ricinoleate prepolymers are also useful as the polyol component for the same reason. However, any hydroxyl bearing material having at least two hydroxyl groups are suitable, including polyhydric alcohols, polyester polyols, and the like. Preferred polyols include those which provide good adhesive properties when green strength is not needed.

When a hydroxy terminated prepolymer is desired, this polyol can be made by reacting an isocyanate having an average functionality of two or greater with a polyol having an average hydroxyl functionality of two or greater at an isocyanate/hydroxyl (NCO/OH) ratio of no greater than 0.99/1. The polyol resulting from this reaction substantially has no reactive isocyanate groups but does have residual unreacted hydroxyl groups. The methods of preparation of such polyol/isocyanate adducts are well known in the art and need no further explanation.

The term "organic isocyanate compound" is used to describe the isocyanate or polyisocyanate compounds that are suitable for use in this invention. Such organic isocyanate compounds include aromatic, aliphatic, and cycloaliphatic polyisocyanates and combinations thereof. Representative of these types are the diisocyanates.

Both aromatic and aliphatic polyisocyanates can be used to react with the polyol when making the isocyanate terminated prepolymer or polyurethanes of this invention. The preferred polyisocyanates are toluene diisocyanate (TDI) and diphenylmethane diisocyanate (MDI). Illustrative of other suitable polyisocyanates are the following isophorone diisocyanate (IPDI), 4,4',4'' triphenyl methane triisocyanate, polymethylene polyphenyl isocyanate, m-phenylene, 1-chlorophenylene 2,4 diisocyanates, methylene-bis(4-cyclohexylisocyanate), or an equivalent The methods of preparation of the above prepolymers are well known in the art and need no further explanation.

The isocyanate terminated prepolymers of this invention are preferably made by reacting an isocyanate having an average functionality of 2 or greater with a polyol having an average hydroxyl functionality of 2 or greater. The polyol is reacted with an excess of isocyanate so that the available or residual isocyanate content of the finished prepolymer, excluding solvent and expressed as 100% solids, should be at least approximately 2% by weight. In this regard the NCO/OH ratio of the prepolymer can range to as high as 25/1.

A wide range of combinations of polyol, isocyanate compound, and TPU are possible, depending upon the intended use. Solvent may or may not be used, depending on the percent solids desired in the final adhesive, 100% solids being achieved with no solvent. Formulations of as low as 20% solids may be desired for certain applications. The solvent can be used to control the viscosity of the final product. As noted above, prepolymers, whether isocyanate terminated or hydroxyl terminated, can be used to obtain particular results. The relative amount of NCO/OH controls which type prepolymer is made. Isocyanate terminated prepolymers, or excess isocyanate in the adhesive enables moisture curable formulations to be obtained. When hydroxy terminated prepolymers or excess polyol is used, other curing agents, preferably the isocyanates, are used.

The TPU may be combined with the isocyanate terminated prepolymer by several methods. Merely by way of illustration and without limiting the scope of the claims hereof, some of the methods are: (a) the TPU is dissolved in either of the components used to form the prepolymer manufacturing prior to or during the reaction process; (b) the TPU is dissolved in the finished prepolymer; (c) the TPU is added to the polymer as a solution of TPU dissolved in solvent, or dissolved in a non-reactive resin or in a non-reactive plasticizer or combination of the same; (d) The TPU could be added to the prepolymer dissolved in reactive materials such as polyols, amines or other solutions that can react with isocyanate terminated prepolymers to form an adhesive formulation.

When combining by methods (a), (b) and (c) above, the composition of the isocyanate terminated prepolymer/TPU mixture could be used as either a one package moisture cure urethane or as the isocyanate part of a two package urethane in which the other part is a reactive polyol, amine, or other material that reacts with such isocyanate terminated prepolymers. In (d) the TPU rubber would be the part of a two package urethane that reacts with the other part which is the isocyanate terminated prepolymer.

The TPU may be combined with the polyol or hydroxyl terminated prepolymer by several methods similar to those used for preparation of the isocyanate terminated prepolymer. These include: (a) the TPU is dissolved in either of the components employed in the preparation of the hydroxyl terminated prepolymer prior to or during the reaction process; (b) the TPU is dissolved in the resulting hydroxyl terminated prepolymer or in the polyol; (c) the TPU is added to the polyol or prepolymer as a solution of TPU dissolved in a solvent, or dissolved in a non-reactive resin or a non-reactive plasticizer or combination of the same; and (d) the TPU is added to the polyol or prepolymer by first dissolving in isocyanates, in blocked isocyanates, in reactive phenolics, in melamine-formaldehyde, in urea-formaldehyde or other resins that will chemically react with the polyol or hydroxyl terminated prepolymer. In some cases when adding the TPU by this method the TPU would be in the part of a two-component system which reacts with the other part which is the polyol or hydroxyl terminated prepolymer.

The key ingredient to these composition is the TPU. This component, which is advantageously used in a chipped or milled condition, must be soluble in MEK to at least 1% by weight, i.e., 1 gram TPU in 99 grams solvent, preferably at least 10% up to 50% by weight i.e., 50 TPU in 50 grams solvent. The greater the solubility of the TPU in MEK, the less solvent is needed in the adhesive. Also 100% solids formulations do not use any solvent.

The most preferred TPU is MILLATHANE E-34 TPU. This compound along with other suitable TPUs are disclosed and described in U.S. Pat. No. 3,043,807, the content of which is expressly incorporated by reference herein.

The TPU is a solid in absence of solvent. It can be linear or branched and hydroxy terminated, but is not crosslinked. The solubility in MEK is critical for achieving the desired results according to the invention.

Thus, to determine suitable TPU's according to the invention, one skilled in the art must conduct a routine screening test to determine whether the TPU is soluble in MEK to at least 1 weight percent. Also, MEK is a preferred solvent for use in the formulations of the invention when a solvent is desired.

When 100 parts of polyol is used, the preferred amount of TPU ranges from 2 to 40 parts. The amount of solvent can typically range from 0 to 300 parts, based on the 100 parts of polyol. As noted above, the amount of isocyanate compound can vary to provide an NCO-/OH ratio of anywhere from 0.5/1 to 25/1.

The solvent is an optional ingredient for controlling the viscosity to the desired range for providing a sprayable, pourable, trowelable, or squeezeable consistency to the adhesive. Where really low viscosities are needed, such as for laminating adhesives, the formulation may contain sufficient solvent to provide as low as 20% solids. Usually, however, 60% solids (or more) is used in typical adhesive formulations.

EXAMPLES

The adhesives of this invention are further identified by reference to the following examples. These examples show preferred formulations which should not be used to limit the scope of the invention. In these examples, all proportions are in parts by weight unless otherwise specified.

EXAMPLE 1

The following formulations illustrate one component moisture cure adhesives having high green strength in accordance with the invention. In formulations A, C and E, 6 parts of the MILLATHANE E-34, TPU was added as 30 parts of a 20% by weight solution of the E-34 in methyl ethyl ketone (i.e. 6 parts E-34 in 24 parts MEK), along with 16 parts of additional solvent. In comparative formulations B, D and F, 40 parts of the solvent alone was added.

| Compound | Formulation | | | | | |
|---|---|---|---|---|---|---|
| | A | B | C | D | E | F |
| DB-Oil | 35.7 | 35.7 | — | — | — | — |
| Lexorez 5162-280 | — | — | 28.8 | 28.8 | — | — |
| Niax PPG 1025 | — | — | — | — | 24.6 | 24.6 |
| Niaz LG-168 | — | — | — | — | 13.6 | 13.6 |
| Toluene diisocyanate | 18.2 | 18.2 | 25.1 | 25.1 | 15.7 | 15.7 |
| Millathane E-34 TPU | 6 | — | 6 | — | 6 | — |
| Methyl ethyl ketone | 40 | 40 | 40 | 40 | 40 | 40 |
| Catalyst (T-12) | 0.1 | 0.1 | 0.1 | 0.1 | 0.1 | 0.1 |
| Total | 100 | 94 | 100 | 94 | 100 | 94 |

The Lexorez 5162-280 is a butylene glycol adipate having an OH number of 281, a functionality of 2.6 and a molecular weight of 521. Niax LG-168 is a polypropylene glycol triol having an OH number of 168, a functionality of 3 and a molecular weight of 1000, while the Niax PPG 1025 is a polypropyleneglycol diol having an OH number of 147, a functionality of 2 and a molecular weight of 1000.

Also, the NCO/OH ratio for each formulation is about 2:1. Each formulation was tested after mixing and standing for 15 minutes for green strength by drawing a 3 mil film using a Bird Gauge and measuring green strength on a relative scale of 0–10 (10 being the highest). Results were as follows:

| | Formulation | | | | | |
|---|---|---|---|---|---|---|
| | A | B | C | D | E | F |
| Relative Green Strength | 8 | 1 | 6 | 0 | 8 | 0 |

EXAMPLE 2

The following formulations illustrate two-component, 100% solids urethane adhesives having high green strength. In these formulations, solvent is not used, and the NCO/OH ratio is substantially stoichiometric (i.e., 1.05/1). Formulations H, J and L are comparative.

| Compound | Formulation | | | | | |
|---|---|---|---|---|---|---|
| | G | H | I | J | K | L |
| Component A toluene diisocyanate | 9.6 | 9.6 | 13.2 | 13.2 | 8.2 | 8.2 |
| Component B: | | | | | | |
| DB-Oil | 35.8 | 35.8 | 28.9 | 28.9 | — | — |
| Lexorex 5162-280 | — | — | 28.9 | 28.9 | — | — |
| Niax PPG 1025 | — | — | — | — | 24.7 | 24.7 |
| Niax LG-168 | — | — | — | — | 13.6 | 13.6 |
| Millathane E-34 TPU | 5.0 | — | 4.7 | — | 5.2 | — |
| Catalyst (T-12) | 0.1 | 0.1 | 0.1 | 0.1 | 0.1 | 0.1 |
| Total | 50.5 | 45.5 | 46.9 | 42.2 | 51.8 | 46.6 |

The compounds of component B were combined before component B was mixed with component A. These formulations were then tested in the same manner as in Example 1. Results were as follows:

| | Formulation | | | | | |
|---|---|---|---|---|---|---|
| | G | H | I | J | K | L |
| Relative Green Strength | 3 | 0 | 4 | 2 | 1 | 0 |

EXAMPLE 3

The following formulations illustrate two components, 100% solids urethane adhesives having high green strength. In these formulations, an isocyanate terminated prepolymer was prepared, with the NCO-/OH ratio of each prepolymer being about 22.1. Formulations N, P, and R are comparative.

| Compound | Formulation | | | | | |
|---|---|---|---|---|---|---|
| | M | N | O | P | Q | R |
| Component A: | | | | | | |
| Toluene diisocyanate | 9.6 | 9.6 | 13.2 | 13.2 | 8.2 | 8.2 |
| DB-Oil | 1.9 | 1.9 | — | — | — | — |
| Lexorez 5162-280 | — | — | 1.5 | 1.5 | — | — |
| Niax PPG LG-168 | — | — | — | — | 1.6 | 1.6 |
| Component B: | | | | | | |
| DB-Oil | 33.9 | 33.9 | — | — | — | — |
| Lexorez 5162-280 | — | — | 27.4 | 27.4 | — | — |
| Niax PPG 1025 | — | — | — | — | 24.7 | 24.7 |
| Niax PPG LG-168 | — | — | — | — | 12.0 | 12.0 |
| Millathane E-34 TPU | 5.0 | — | 4.7 | — | 5.2 | — |
| Catalyst (T-12) | 0.1 | 0.1 | 0.1 | 0.1 | 0.1 | 0.1 |
| Total | 50.1 | 45.5 | 46.9 | 42.2 | 51.8 | 46.6 |

These formulations were tested for relative green strength in the same manner as in Example 1, with the following results:

| | Formulation | | | | | |
|---|---|---|---|---|---|---|
| | M | N | O | P | Q | R |
| Relative Green Strength | 3 | 0 | 4 | 2 | 1 | 0 |

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A composition for forming a urethane adhesive having high green strength comprising:
   a polyol;
   a thermoplastic polyurethane having a pendant or extra-linear group which contains an aliphatic non-benzenoid

group and which is soluble in methyl ethyl ketone to at least 1 weight percent, said thermoplastic polyurethane present in an amount sufficient to impart tack and green strength to the adhesive;
   an organic isocyanate compound in an amount sufficient to impart curing properties to the composition, wherein one of said polyol and said isocyanate is present in a molar excess compared to the other; and
   a solvent which is compatible with the other components in an amount sufficient to form a single phase liquid solution.

2. The composition of claim 1 wherein the polyol is castor oil, or a polyether polyol.

3. The composition of claim 1 wherein the isocyanate compound is an aromatic, aliphatic, or cycloaliphatic polyisocyanate and wherein the polyol is a polyhydric alcohol.

4. The composition of claim 1 wherein the thermoplastic polyurethane is MILLATHANE E-34 TPU.

5. The composition of claim 1 wherein the solvent comprises methyl ethyl ketone.

6. A curable adhesive composition having high green strength, comprising the reaction product of:
   a polyol;
   a thermoplastic polyurethane having a pendant or extra-linear group which contains an aliphatic non-benzenoid

group and which is soluble in methyl ethyl ketone to at least 1 weight percent, said thermoplastic polyurethane present in an amount sufficient to impart tack and green strength to the adhesive;
   an organic isocyanate compound in an amount sufficient to impart curing properties to the composition, wherein one of said polyol and said isocyanate is present in a molar excess compared to the other; and
   a solvent in an amount of between 1 and 300 parts by weight based on 100 parts polyol to form a single phase liquid solution.

7. The composition of claim 6 wherein the thermoplastic polyurethane is MILLATHANE E-34 TPU.

8. The composition of claim 6 wherein the isocyanate compound is present in an amount such that the ratio of NCO groups in the isocyanate compound to OH groups in the polyol ranges from 0.5:1 to 25:1.

9. The composition of claim 6 wherein the solvent comprises methyl ethyl ketone.

10. The composition of claim 6 wherein the thermoplastic polyurethane is present in an amount of between about 2 and 40 parts by weight based on 100 parts polyol.

11. A method for curing the composition of claim 6 which comprises:
    combining the isocyanate compound with the thermoplastic polyurethane to form a mixture; and
    reacting the mixture with the polyol to form a cured adhesive.

12. A method for curing the composition of claim 6 which comprises:
    combining the isocyanate compound and polyol to form a hydroxyl terminated prepolymer;
    adding the thermoplastic polyurethane to the prepolymer to form a mixture;
    reacting the mixture with excess additional isocyanate compound to form a moisture curable adhesive composition; and
    curing said composition by exposure to moist air or a second polyol to form a cured adhesive.

13. A method for curing a composition of a polyol; a thermoplastic polyurethane having a pendant or extra-linear group which contains an aliphatic non-benzenoid

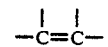

group and which is soluble in methyl ethyl ketone to at least 1 weight percent, said thermoplastic polyurethane present in an amount sufficient to impart tack and green strength to the adhesive; an organic isocyanate compound; and a solvent which is compatible with the other components in an amount sufficient to form a single phase liquid solution, which comprises:
    combining the isocyanate compound and polyol to form a prepolymer having an available isocyanate content of at least 2% by weight;
    adding the thermoplastic polyurethane to the prepolymer; and
    curing the composition by exposure to moist air or by reaction with a second polyol to form a cured adhesive.

14. A method of curing a adhesive composition of a polyol; a thermoplastic polyurethane having a pendant or extra-linear group which contains an aliphatic non-benzenoid

group and which is soluble in methyl ethyl ketone to at least 1 weight percent, said thermoplastic polyurethane present in an amount sufficient to impart tack and green strength to the adhesive; an organic isocyanate compound; and a solvent which is compatible with the other components in an amount sufficient to form a single phase liquid solution, which comprises:

combining the polyol and the thermoplastic polyurethane to form a mixture; and reacting the mixture with the isocyanate compound to form a cured adhesive.

15. A method for curing a composition of a polyol; a thermoplastic polyurethane having a pendant or extralinear group which contains an aliphatic non-benzenoid

group and which is soluble in methyl ethyl ketone to at least 1 weight percent, said thermoplastic polyurethane present in an amount sufficient to impart tack and green strength to the adhesive; an organic isocyanate compound; and a solvent which is compatible with the other components in an amount sufficient to form a single phase liquid solution, which comprises:

combining the isocyanate compound and polyol to form a hydroxyl terminated prepolymer;

adding the thermoplastic polyurethane to the prepolymer to form a mixture;

reacting the mixture with excess additional isocyanate compound to form a moisture curable adhesive composition; and curing said composition by exposure to moist air or a second polyol to form a cured adhesive.

16. A method for imparting tack and green strength to a urethane adhesive composition which contains a polyol and an organic isocyanate compound, which method comprises adding to said composition a sufficient amount of a thermoplastic urethane which is soluble in methyl ethyl ketone to at least 1 weight percent to impart tack and green strength properties to the adhesive and adjusting the viscosity of the adhesive by adding a solvent which is compatible with the components of the adhesive to form a single phase solution prior to utilizing the adhesive for joining components together.

17. The method of claim 16 wherein the amount of thermoplastic polyurethane ranges from about 2 to 40 parts by weight based on 100 parts polyol.

18. The method of claim 16 wherein one of the polyol or the isocyanate compound is present in a molar excess to the other.

19. The method of claim 16 wherein the thermoplastic polyurethane includes a pendent or extra-linear group which contains an aliphatic, non-benzenoid

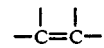

group.

20. The method of claim 16 wherein the solvent comprises methyl ethyl ketone.

21. The method of claim 16 wherein the thermoplastic polyurethane is MILLATHANE E-34 TPU.

* * * * *